(12) United States Patent
Xu (10) Patent No.: US 9,206,741 B2
(45) Date of Patent: Dec. 8, 2015

(54) FLUID SYSTEM WITH GRAVITY CONTROLLED VALVE

(71) Applicant: United Technologies Corporation, Hartford, CT (US)

(72) Inventor: JinQuan Xu, Groton, CT (US)

(73) Assignee: United Technologies Corporation, Hartford, CT (US)

( * ) Notice: Subject to any disclaimer, the term of this patent is extended or adjusted under 35 U.S.C. 154(b) by 453 days.

(21) Appl. No.: 13/689,851

(22) Filed: Nov. 30, 2012

(65) Prior Publication Data

US 2014/0150400 A1 Jun. 5, 2014

(51) Int. Cl.
*F02C 7/14* (2006.01)
*F02C 7/06* (2006.01)

(52) U.S. Cl.
CPC .............. *F02C 7/06* (2013.01); *F05D 2260/60* (2013.01)

(58) Field of Classification Search
CPC ............... F02C 7/06; F02C 7/14; F02C 7/36; F02K 3/072; F01D 25/18; F01D 25/20; F05D 2240/50; F05D 2260/98
USPC ........ 60/39.08; 137/591, 43, 45, 291, 625.44; 184/6.11, 65
See application file for complete search history.

(56) References Cited

U.S. PATENT DOCUMENTS

| | | | |
|---|---|---|---|
| 1,871,055 A | 8/1932 | Hasbrouck | |
| 2,239,098 A | 4/1941 | Hunter | |
| 2,324,464 A | 7/1943 | Parker | |
| 2,494,209 A | 1/1950 | Sikorsky | |
| 2,830,668 A | 4/1958 | Gaubis et al. | |
| 2,831,490 A | 4/1958 | Simcock | |
| 2,860,648 A | 11/1958 | Harrison | |
| 2,942,612 A | 6/1960 | Klank, Jr. | |
| 2,975,793 A | 3/1961 | Klank, Jr. | |
| 2,984,975 A | 5/1961 | Rodgers et al. | |
| 4,049,401 A | 9/1977 | Smith | |
| 4,117,907 A | 10/1978 | Lechler | |
| 4,153,141 A | 5/1979 | Methlie | |
| 4,206,776 A * | 6/1980 | Bader | 137/45 |
| 4,252,140 A | 2/1981 | Hildebrandt | |
| 4,309,870 A | 1/1982 | Guest et al. | |
| 4,367,638 A | 1/1983 | Gray | |
| 4,531,358 A | 7/1985 | Smith | |
| 4,545,791 A | 10/1985 | Schweikl et al. | |

(Continued)

FOREIGN PATENT DOCUMENTS

| | | |
|---|---|---|
| EP | 1104742 A1 | 6/2001 |
| FR | 2621562 A1 | 4/1989 |
| GB | 580006 | 8/1946 |

OTHER PUBLICATIONS

Extra-Flugzeugbau GmbH, Service Manual Extra 300, Chapter 79—Oil System, page date: Jan. 31, 1995, pp. 1-12.

*Primary Examiner* — Ehud Gartenberg
*Assistant Examiner* — Filippo Manfredi
(74) *Attorney, Agent, or Firm* — Kinney & Lange, P.A.

(57) ABSTRACT

A fluid system for use with a gas turbine engine includes a reservoir having a reservoir inlet and a reservoir outlet and includes a supply assembly positioned in the reservoir. The supply assembly includes a first passage, a second passage, and a valve disc. The first and second passages are fluidically connected to the reservoir outlet. The valve disc is positioned in the first passage. The valve disc is pivotable about an axis and is weighted to have a center of gravity offset from the axis.

19 Claims, 6 Drawing Sheets

(56) References Cited

U.S. PATENT DOCUMENTS

| | | |
|---|---|---|
| 4,580,591 A | 4/1986 | Lebourg |
| 4,664,134 A | 5/1987 | Pera |
| 4,669,893 A | 6/1987 | Chalaire et al. |
| 4,782,658 A | 11/1988 | Perry |
| 4,813,445 A | 3/1989 | Lu |
| 4,815,436 A | 3/1989 | Sasaki et al. |
| 4,947,639 A | 8/1990 | Hibner et al. |
| 4,974,410 A | 12/1990 | Wright et al. |
| 4,983,051 A | 1/1991 | Hibner et al. |
| 5,107,676 A | 4/1992 | Hadaway et al. |
| 5,110,257 A | 5/1992 | Hibner et al. |
| 5,121,598 A | 6/1992 | Butler |
| 5,237,977 A | 8/1993 | Tuckey |
| 5,344,239 A | 9/1994 | Stallone et al. |
| 5,433,674 A | 7/1995 | Sheridan et al. |
| 5,472,383 A | 12/1995 | McKibbin |
| 5,590,736 A | 1/1997 | Morris et al. |
| 5,911,678 A | 6/1999 | White |
| 6,142,167 A | 11/2000 | Pettesch |
| 6,223,616 B1 | 5/2001 | Sheridan |
| 6,267,147 B1 | 7/2001 | Rago |
| 6,394,123 B2 | 5/2002 | Menu et al. |
| 6,463,819 B1 | 10/2002 | Rago |
| 6,698,692 B1 | 3/2004 | Tichenor et al. |
| 6,793,042 B2 | 9/2004 | Brouillet |
| 7,118,336 B2 | 10/2006 | Waddleton |
| 7,712,317 B2 | 5/2010 | Scanlon |
| 2006/0032663 A1 | 2/2006 | Hosoya |
| 2006/0090964 A1* | 5/2006 | Hoang et al. .................. 184/6.2 |
| 2008/0063333 A1 | 3/2008 | Bruno et al. |
| 2009/0306767 A1* | 12/2009 | Lendlein ...................... 623/1.18 |
| 2010/0065374 A1 | 3/2010 | Szolomayer et al. |
| 2010/0294371 A1 | 11/2010 | Parnin et al. |
| 2010/0296947 A1* | 11/2010 | DiBenedetto et al. .......... 417/53 |

* cited by examiner

FLUID SYSTEM WITH GRAVITY CONTROLLED VALVE

BACKGROUND

The present invention relates to gas turbine engines, and in particular, to fluid systems for gas turbine engines.

Gas turbine engines typically include one or more engine components that benefit from a supply of fluid, such as lubricating liquid. Such lubrication systems typically include a reservoir for supplying lubricating liquid to those engine components. In some gas turbine engines, certain engine components are desired to be supplied with lubricating liquid during substantially all operating conditions.

However, a reservoir for a lubrication system of a gas turbine engine mounted on an aircraft may experience "negative gravity" conditions such as the aircraft turning upside down, the aircraft accelerating toward the Earth at a rate equal to or greater than the rate of gravity, or the aircraft decelerating at the end of a vertical ascent. Under negative gravity conditions, the liquid in the reservoir may rise to the top, which may expose an opening of a reservoir outlet to air and interrupt the supply of liquid to a supply pump and, consequently, interrupt supply to the engine components.

SUMMARY

According to the present invention, a fluid system for use with a gas turbine engine includes a reservoir having a reservoir inlet and a reservoir outlet and includes a supply assembly positioned in the reservoir. The supply assembly includes a first passage, a second passage, and a valve disc. The first and second passages are fluidically connected to the reservoir outlet. The valve disc is positioned in the first passage. The valve disc is pivotable about an axis and is weighted to have a center of gravity offset from the axis.

Another embodiment is a fluid system for use with a gas turbine engine including a reservoir having a reservoir inlet and a reservoir outlet and a supply assembly positioned in the reservoir. The supply assembly includes a first passage, a second passage, and a pivotable valve. The first and second passages are fluidically connected to the reservoir outlet. The pivotable valve is fluidically connected to the first passage and configured to be open under positive gravity conditions and to be closed under negative gravity conditions.

Another embodiment is a gas turbine engine including a spool, a fan, a fan drive gear system, a reservoir, and a supply assembly. The spool includes a compressor and a turbine connected by a spool shaft. The fan drive gear system connects the fan to the spool shaft such that rotation of the spool drives rotation of the fan. The reservoir has a reservoir inlet and a reservoir outlet. The fan drive gear system is fluidically connected to the reservoir inlet and the reservoir outlet. The supply assembly is positioned in the reservoir and includes a first passage fluidically connected to the reservoir outlet, a second passage fluidically connected to the reservoir outlet, and a pivotable valve fluidically connected to the first passage. The pivotable valve is configured to be open under positive gravity conditions and to be closed under negative gravity conditions.

DETAILED DESCRIPTION

Figure 1:
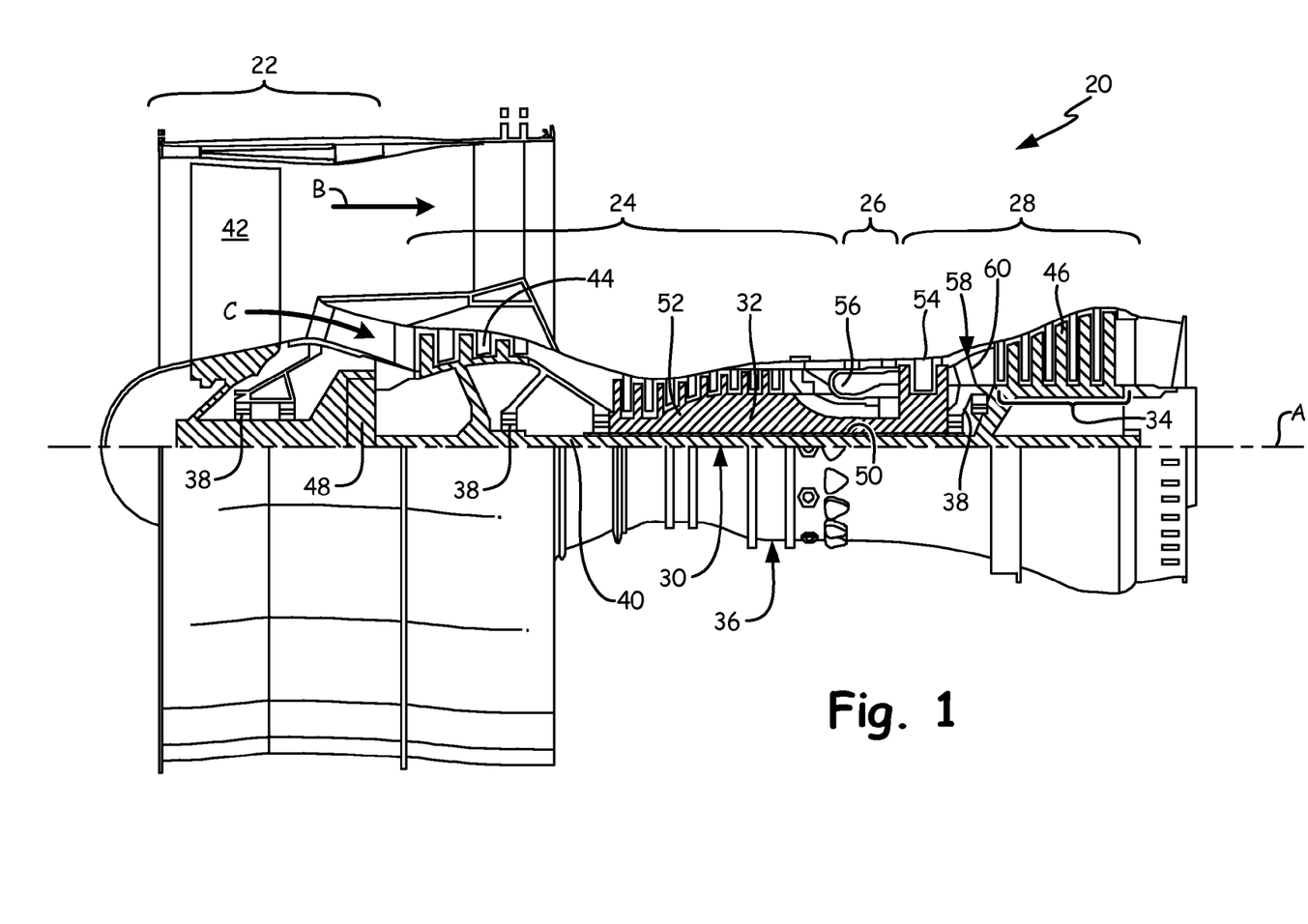
FIG. 1 is a schematic side sectional view of a gas turbine engine.

FIG. 1 schematically illustrates an example gas turbine engine 20 that includes fan section 22, compressor section 24, combustor section 26 and turbine section 28. Alternative engines might include an augmenter section (not shown) among other systems or features. Fan section 22 drives air along bypass flow path B while compressor section 24 draws air in along core flow path C where air is compressed and communicated to combustor section 26. In combustor section 26, air is mixed with fuel and ignited to generate a high pressure exhaust gas stream that expands through turbine section 28 where energy is extracted and utilized to drive fan section 22 and compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes low speed spool 30 and high speed spool 32 mounted for rotation about an engine central longitudinal axis A relative to an engine static structure 36 via several bearing systems 38. It should be understood that various bearing systems 38 at various locations may alternatively or additionally be provided.

Low speed spool 30 generally includes inner shaft 40 that connects fan 42 and low pressure (or first) compressor section 44 to low pressure (or first) turbine section 46. Inner shaft 40 drives fan 42 through a speed change device, such as geared architecture 48, to drive fan 42 at a lower speed than low speed spool 30. High-speed spool 32 includes outer shaft 50 that interconnects high pressure (or second) compressor section 52 and high pressure (or second) turbine section 54. Inner shaft 40 and outer shaft 50 are concentric and rotate via bearing systems 38 about engine central longitudinal axis A.

Combustor 56 is arranged between high pressure compressor 52 and high pressure turbine 54. In one example, high pressure turbine 54 includes at least two stages to provide a double stage high pressure turbine 54. In another example, high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of low pressure turbine 46 as related to the pressure measured at the outlet of low pressure turbine 46 prior to an exhaust nozzle.

Mid-turbine frame 58 of engine static structure 36 is arranged generally between high pressure turbine 54 and low pressure turbine 46. Mid-turbine frame 58 further supports bearing systems 38 in turbine section 28 as well as setting airflow entering low pressure turbine 46.

The core airflow C is compressed by low pressure compressor 44 then by high pressure compressor 52, mixed with fuel and ignited in combustor 56 to produce high speed exhaust gases that are then expanded through high pressure turbine 54 and low pressure turbine 46. Mid-turbine frame 58 includes vanes 60, which are in the core airflow path and function as an inlet guide vane for low pressure turbine 46. Utilizing vane 60 of mid-turbine frame 58 as the inlet guide vane for low pressure turbine 46 decreases the length of low pressure turbine 46 without increasing the axial length of mid-turbine frame 58. Reducing or eliminating the number of vanes in low pressure turbine 46 shortens the axial length of turbine section 28. Thus, the compactness of gas turbine engine 20 is increased and a higher power density may be achieved.

The disclosed gas turbine engine 20 in one example is a high-bypass geared aircraft engine. In a further example, gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, gas turbine engine 20 includes a bypass ratio greater than about ten (10:1) and the fan diameter is significantly larger than an outer diameter of low pressure compressor 44. It should be understood, however, that the above parameters are only exemplary of one embodiment of a gas turbine engine including a geared architecture and that the present disclosure is applicable to other gas turbine engines.

A significant amount of thrust is provided by bypass flow B due to the high bypass ratio. Fan section 22 of engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/518.7]^{0.5}$. The "Low corrected fan tip speed", as disclosed herein according to one non-limiting embodiment, is less than about 1150 ft/second.

The example gas turbine engine includes fan section 22 that comprises in one non-limiting embodiment less than about twenty-six (26) fan blades 42. In another non-limiting embodiment, fan section 22 includes less than about twenty (20) fan blades 42. Moreover, in one disclosed embodiment low pressure turbine 46 includes no more than about six (6) turbine rotors schematically indicated at 34. In another non-limiting example embodiment low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate fan section 22, and therefore the relationship between the number of turbine rotors 34 in low pressure turbine 46 and the number of fan blades 42 in fan section 22 discloses an example gas turbine engine 20 with increased power transfer efficiency.

Figure 2:
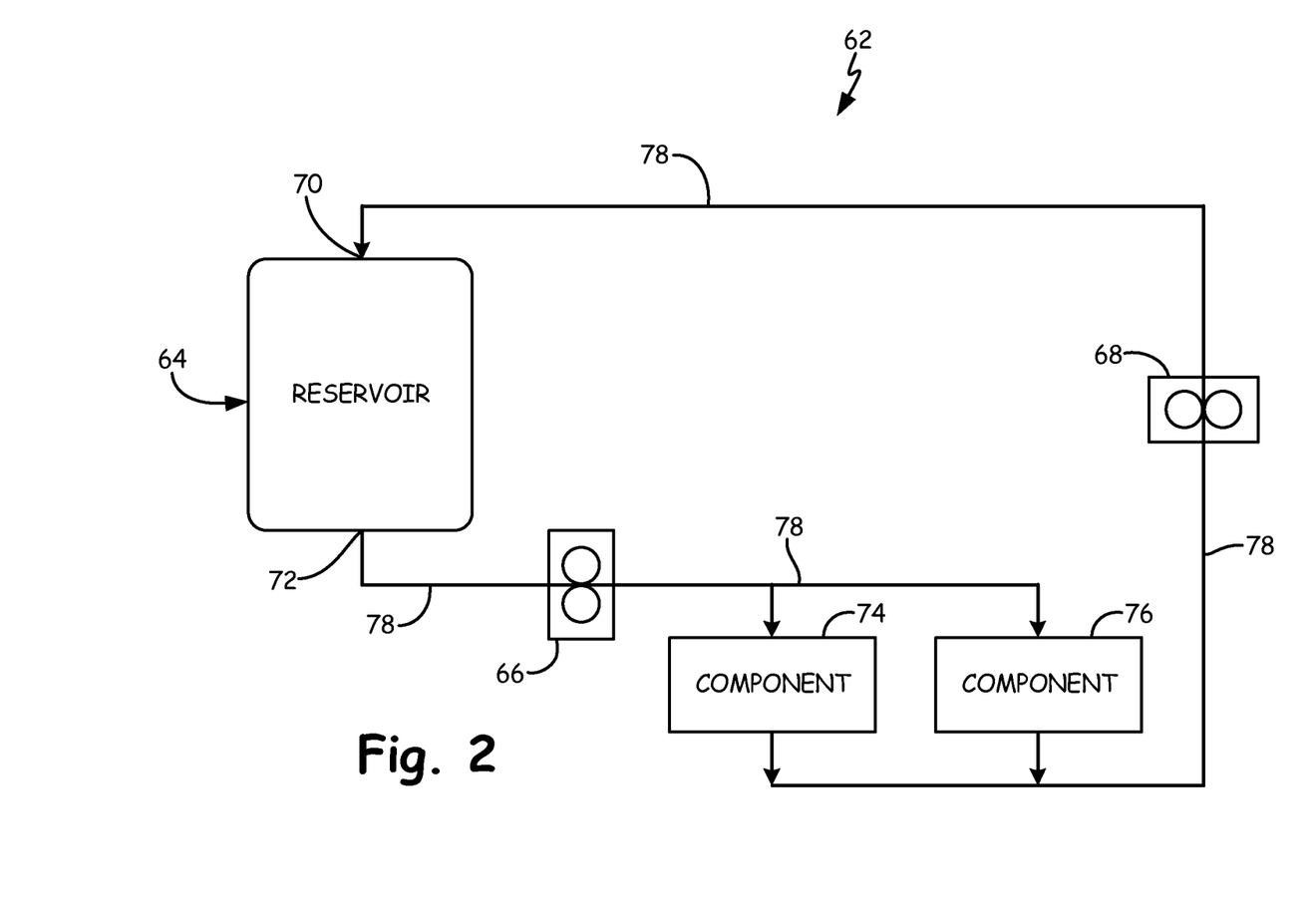
FIG. 2 is a schematic view of a fluid system for use in the gas turbine engine of FIG. 1.

FIG. 2 is a schematic view of fluid system 62 for use in gas turbine engine 20 (shown in FIG. 1). In the illustrated embodiment, fluid system 62 is a lubrication system. In other embodiments, fluid system 62 can be a fuel system and other fluid system used in a gas turbine engine. Fluid system 62 includes reservoir 64, supply pump 66 and scavenge pump 68. Reservoir 64 includes reservoir inlet 70 and reservoir outlet 72. Fluid system 62 includes a network of passages 78 fluidically connecting reservoir 64, supply pump 66, scavenge pump 68, and components 74 and 76. Supply pump 66 is fluidically connected between reservoir outlet 72 and components 74 and 76. Scavenge pump 68 is fluidically connected between reservoir inlet 70 and components 74 and 76. Components 74 and 76 can be one of various components in gas turbine engine 20 that benefit from a supply of lubricating liquid. For example, in one embodiment, component 74 can be bearings and gears of a fan drive gear system such as geared architecture 48 (shown in FIG. 1) and component 76 can be one or more bearing systems 38 (shown in FIG. 1). In operation, supply pump 66 can pump lubricating liquid, such as oil, from reservoir 64 to components 74 and 76 for lubricating and cooling components 74 and 76. Scavenge pump 68 can then scavenge used lubricating liquid from components 74 and 76 and return that lubricating liquid to reservoir 64.

In one embodiment, reservoir 64 can be a main reservoir that supplies lubricating liquid to substantially all lubricated components of gas turbine engine 20. In another embodiment, reservoir 64 can be an auxiliary reservoir (or backup reservoir) that supplies lubricating liquid to only certain components of gas turbine engine 20 and under certain operating conditions. For example, reservoir 64 can be dedicated to supply lubricating liquid to bearings and gears of geared architecture 48. In various embodiments, fluid system 62 can include one or more valves, filters, sensors, sumps, heat exchangers, and/or other components (not shown) suitable for an application.

Figure 3A:
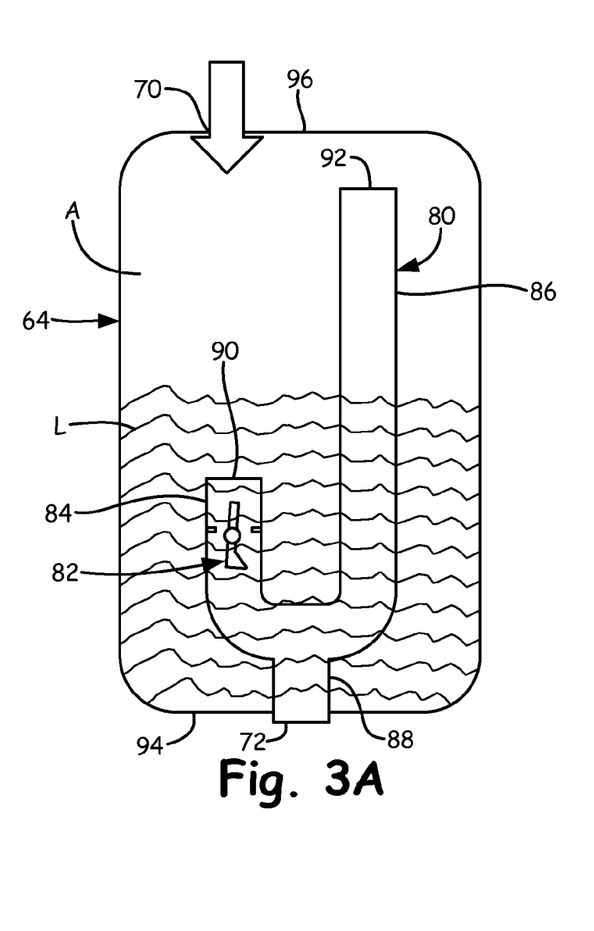
FIG. 3A is a schematic side sectional view of a reservoir having a supply assembly with a valve in an open position, for use in the fluid system of FIG. 2.

FIG. 3A is a schematic side sectional view of reservoir 64 having supply assembly 80 with valve 82 in an open position. Supply assembly 80 includes first passage 84 and second passage 86 fluidly connected to reservoir outlet 72 via connection passage 88. First passage 84 includes first passage inlet 90, and second passage 86 includes second passage inlet 92. First passage 84 is shorter than second passage 86 such that reservoir outlet 72 is nearer first passage inlet 90 than second passage inlet 92.

Reservoir 64 includes reservoir bottom 94 and reservoir top 96. Reservoir top 96 is positioned vertically higher than reservoir bottom 94 during normal operation of reservoir 64 and gas turbine engine 20 (shown in FIG. 1). Reservoir outlet 72 is positioned at and extends through reservoir bottom 94. Reservoir inlet 70 is positioned at and extends through reservoir top 96. Reservoir bottom 94 is nearer first passage inlet 90 than second passage inlet 92 and reservoir top 96 is nearer second passage inlet 92 than first passage inlet 90. Thus, first passage inlet 90 is vertically lower than second passage inlet 92. In the illustrated embodiment, supply assembly 80 is substantially Y-shaped except that second passage 86 is longer than first passage 84. Supply assembly 80 can be positioned partially inside reservoir 64 or can be positioned entirely inside reservoir 64.

Reservoir 64 contains lubricating liquid L for use in fluid system 62 (shown in FIG. 2). As illustrated in FIG. 3A, reservoir 64 is experiencing "positive gravity" conditions causing lubricating liquid L to settle at reservoir bottom 94. Positive gravity conditions can include an aircraft (not shown) that contains reservoir 64 being positioned right side up, on the ground, flying with little or no acceleration, or accelerating in a way that causes net forces acting on lubricating liquid L to be substantially downward. Gas such as air A is lighter and less dense than lubricating liquid L, and thus rises to reservoir top 96 during positive gravity conditions. First passage inlet 90 is submerged in lubricating liquid L, and second passage inlet 92 is exposed to air A. Valve 82 is fluidically connected to, and is positioned in, first passage 84. Valve 82 is in an open position so as to allow flow of lubricating liquid L through first passage 84.

In operation, supply pump 66 (shown in FIG. 2) draws lubricating liquid L through first passage inlet 90 into first passage 84. Lubricating liquid L then flows through valve 82, through connection passage 88, and out reservoir outlet 72. Due to the orientation of reservoir 64 and supply assembly 80 in positive gravity conditions, supply pump 66 draws lubricating liquid L through first passage 84, while drawing little or no air A through second passage 86. A separate valve (not shown) could optionally be included in second passage 86, but is not necessary in the illustrated embodiment. Thus, second passage 86 can be free of valves.

Figure 3B:
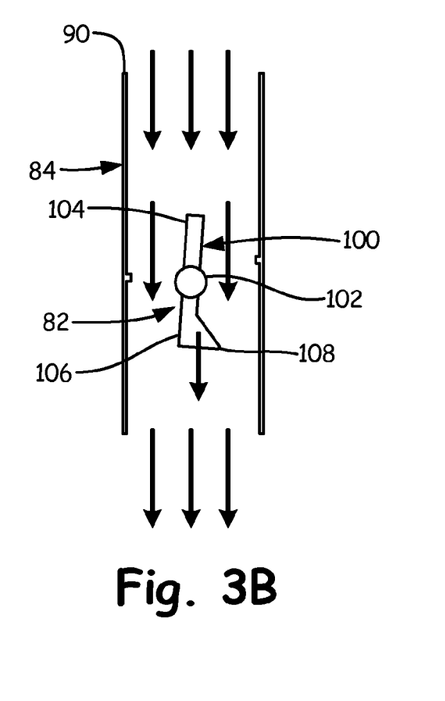
FIG. 3B is a schematic side sectional view of the valve of FIG. 3A.

FIG. 3B is a schematic side sectional view of valve 82 shown in FIG. 3A. Valve 82 includes valve disc 100 positioned inside first passage 84 and pivotable about axis pin 102. Valve disc 100 is a valve member movable to regulate flow in valve 82. The illustrated valve disc 100 is a substantially round and flat valve member. Thus, valve disc 100 can be described as having a traditional "disk-shape." In other embodiments, valve disc 100 need not be disk-shaped, but can have other shapes suitable for operation as a movable valve member.

Axis pin 102 defines an axis about which valve disc 100 can pivot. Valve disc 100 can be fixedly attached to axis pin 102 or can rotate with respect to axis pin 102. Valve disc 100 includes first disc side 104 and second disc side 106. In the illustrated embodiment, second disc side 106 includes weighted mass 108 which increases the mass and weight of second disc side 106. Because of the increased mass and location of weighted mass 108, valve disc 100 has a center of gravity offset from axis pin 102. Because valve disc 100 has an offset center of gravity, valve disc 100 is rotated open during positive gravity conditions. Thus, first passage 84 is open under positive gravity conditions.

In alternative embodiments, valve disc 100 can have a center of gravity offset from axis pin 102 without having weighted mass 108. For example, first disc side 104 can be made of or include a first material and second disc side can be made of or include a second material having a different, greater density than that of the first material. Because the second material has a greater density than the first material, valve disc 100 can be weighted so as to cause valve 82 to be pivoted open during positive gravity conditions. Thus, first passage 84 is open under positive gravity conditions. In other embodiments, valve disc 100 can be shaped and/or weighted differently than illustrated so long as valve disc 100 is actuated open in positive gravity conditions and closed in negative gravity conditions (shown in FIG. 4A).

Figure 4A:
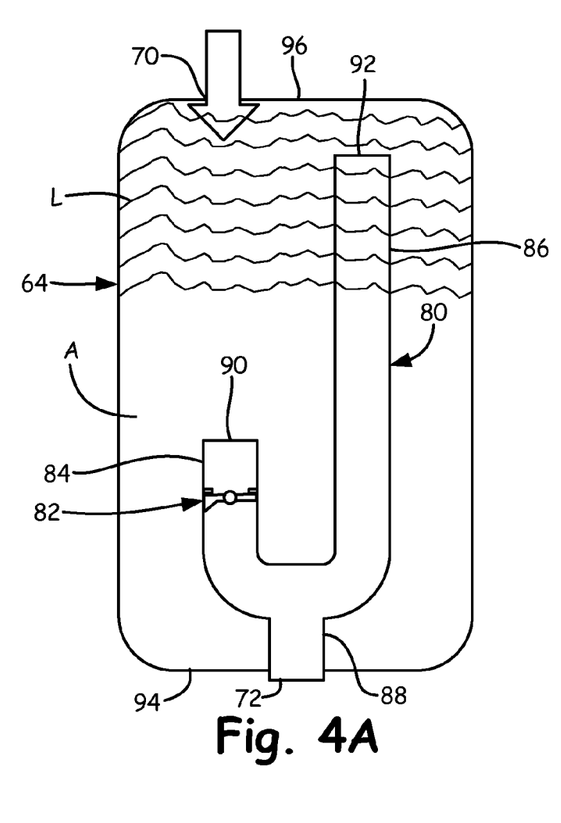
FIG. 4A is a schematic side sectional view of the reservoir of FIG. 3A with the valve in a closed position.

FIG. 4A is a schematic side sectional view of reservoir 64 with valve 82 in a closed position. As illustrated in FIG. 4A, reservoir 64 is experiencing "negative gravity" conditions causing lubricating liquid L to settle at reservoir top 96. Negative gravity conditions can be the aircraft (not shown) and reservoir 64 turning upside down, the aircraft accelerating toward the Earth at a rate equal to or greater than the rate of gravity, or the aircraft decelerating at the end of a vertical ascent. Air A is lighter and less dense than lubricating liquid L, and thus is forced to reservoir bottom 94 during negative gravity conditions. First passage inlet 90 is exposed to air A, and second passage inlet 92 is submerged in lubricating liquid L. Valve 82 is in a closed position so as to reduce or stop flow of air A through first passage 84.

In operation, supply pump 66 (shown in FIG. 2) draws lubricating liquid L through second passage inlet 92 into second passage 86. Lubricating liquid L then flows through connection passage 88, and out reservoir outlet 72. Because valve 82 is substantially closed, supply pump 66 can draw little or no air through first passage 84. Thus, supply assembly 80 can be configured to draw lubricating liquid L through first passage 84 under positive gravity conditions and to draw lubricating liquid L through second passage 86 under negative gravity conditions. Second passage 86 can be open during both positive gravity conditions and negative gravity conditions, yet substantial fluid flows though second passage 86 only under negative gravity conditions.

Figure 4B:
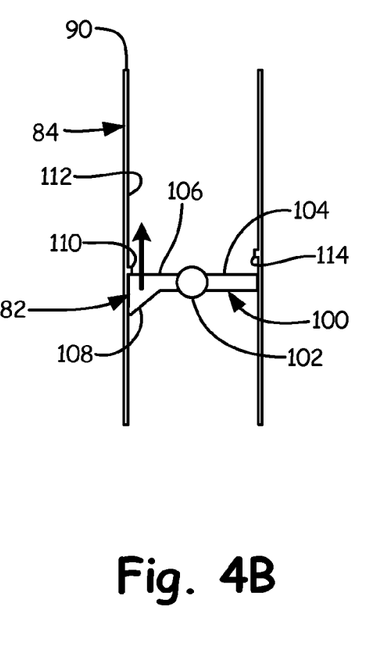
FIG. 4B is a schematic side sectional view of the valve of FIG. 4A.

FIG. 4B is a schematic side sectional view of valve 82 shown in FIG. 4A. Because valve disc 100 has an offset center of gravity, valve disc 100 is rotated closed during negative gravity conditions. In the illustrated embodiment, valve disc 100 has been rotated clockwise such that second disc side 106 is abutting block 110. Block 110 is a stopper extending radially inward from inner surface 112 of first passage 84. Block 110 can stop rotation of valve disc 100 and holds valve disc 100 in a closed position during negative gravity conditions. Another block 114 extends from inner surface 112 opposite block 110. Block 114 can stop rotation of valve disc 100 when valve disc 100 rotates counter-clockwise during negative gravity conditions. Thus, first passage 84 is closed under negative gravity conditions.

Figure 5A:
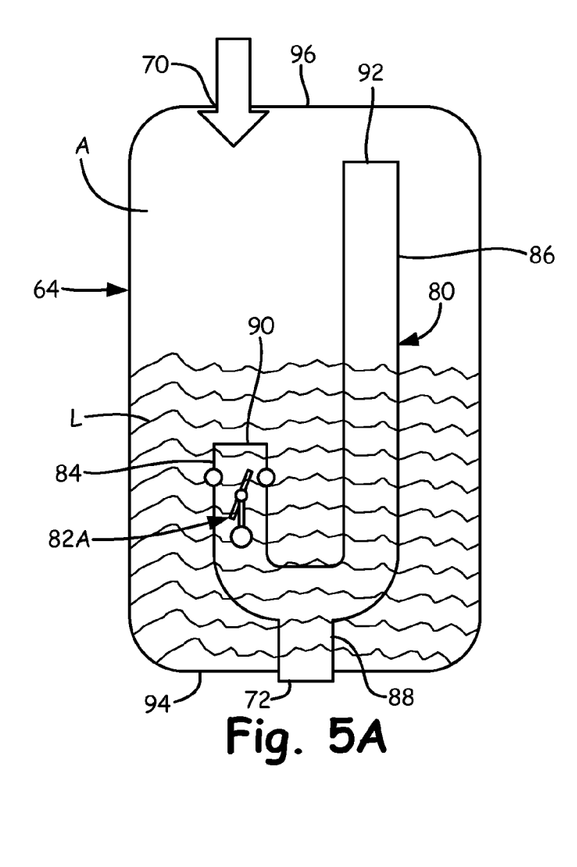
FIG. 5A is a schematic side sectional view of the reservoir of FIGS. 3A and 4A having an alternative embodiment of a valve in an open position.

FIG. 5A is a schematic side sectional view of reservoir 64 including valve 82A in an open position. As illustrated in FIG. 5A, reservoir 64 and valve 82A is experiencing positive gravity conditions causing lubricating liquid L to settle at reservoir bottom 94. Valve 82A is an alternative embodiment of valve 82 (shown in FIGS. 3A, 3B, 4A, and 4B). Valve 82A functions substantially the same as valve 82 but includes a different structure as described further with respect to FIG. 5B.

Figure 5B:
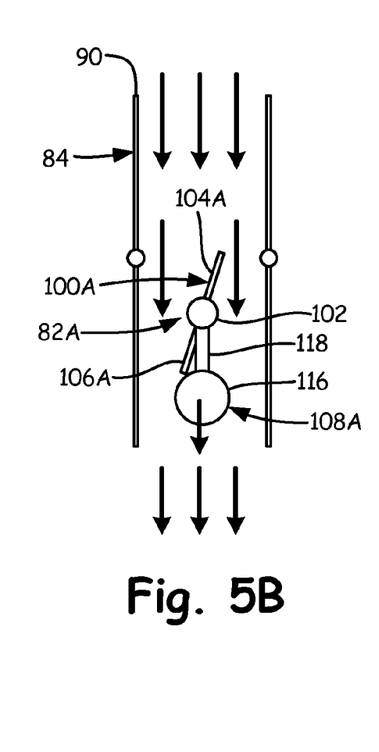
FIG. 5B is a schematic side sectional view of the valve of FIG. 5A.

FIG. 5B is a schematic side sectional view of valve 82A in the open position. Valve 82A includes valve disc 100A positioned inside first passage 84 and pivotable about axis pin 102. Valve disc 82A includes first disc side 104A and second disc side 106A. Valve disc 100A includes weighted mass 108A. Weighted mass 108A is a connecting mass, which includes ball 116 and connector rod 118, both positioned external to first passage 84. Ball 116 is fixedly connected to axis pin 102 via connector rod 118. Axis pin 102 extends through first passage 84 and is fixedly connected to valve disc 100A. Thus, weighed mass 108A is fixedly connected to and rotates with valve disc 100A. Under positive gravity conditions, weighted mass 108A is forced downward toward reservoir bottom 94 (shown in FIG. 5A), which can rotate valve disc 100A to an open position.

Figure 6A:
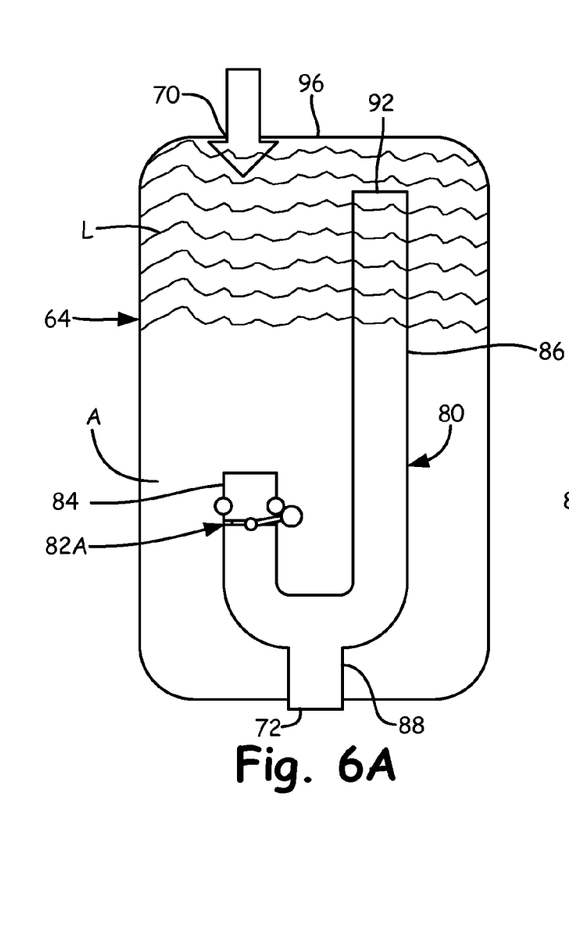
FIG. 6A is a schematic side sectional view of the reservoir of FIG. 5A with the valve in a closed position.

FIG. 6A is a schematic side sectional view of reservoir 64 with valve 82A in a closed position. As illustrated in FIG. 6A, reservoir 64 is experiencing negative gravity conditions causing lubricating liquid L to settle at reservoir top 96. Valve 82A is in a closed position so as to reduce or stop flow of air A through first passage 84.

Figure 6B:
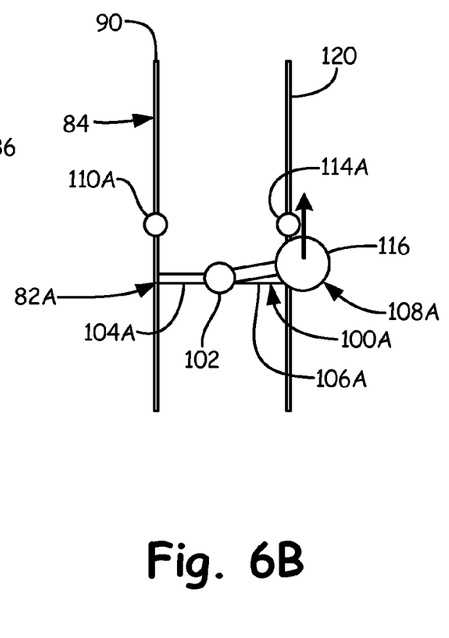
FIG. 6B is a schematic side sectional view of the valve of FIG. 6A.

FIG. 6B is a schematic side sectional view of valve 82A shown in FIG. 6A. Because valve disc 100A has an offset center of gravity due to weighted mass 108A, valve disc 100A is rotated closed during negative gravity conditions. In the illustrated embodiment, blocks 110A and 114A are stoppers attached to outer surface 120 of first passage 84. Valve disc 100A has been rotated counter-clockwise such that ball 116 of weighted mass 108A is abutting block 114A. Block 114A can stop rotation of valve disc 100A and hold valve disc 100A in a closed position during negative gravity conditions. Block 110A is positioned on outer surface 120 opposite block 114A and can stop rotation of valve disc 100A when valve disc 100A rotates clockwise during negative gravity conditions. Thus, valve disc 100A is weighted so as to be closed under negative gravity conditions. Consequently, first passage 84 is closed under negative gravity conditions.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The following are non-exclusive descriptions of possible embodiments of the present invention.

A fluid system for use with a gas turbine engine can include a reservoir having a reservoir inlet and a reservoir outlet and a supply assembly positioned in the reservoir. The supply assembly can include a first passage, a second passage, and a valve disc. The first and second passages can be fluidically connected to the reservoir outlet. The valve disc can be positioned in the first passage. The valve disc can be pivotable about an axis and is weighted to have a center of gravity offset from the axis.

The fluid system of the preceding paragraph can optionally include, additionally and/or alternatively any, one or more of the following features, configurations and/or additional components:

- the first passage can have a first passage inlet and the second passage can have a second passage inlet that is nearer a top of the reservoir than the first passage inlet;
- the valve disc can be weighted such that the first passage is open under positive gravity conditions and closed under negative gravity conditions;
- the valve disc can include a first material on a first side of the axis, the valve disc can include a second material on a second side of the axis, and the second material can have a greater density than that of the first material;
- the valve disc can include a weighted mass attached to a first side of the valve disc;
- the valve disc can be weighted via a connecting mass;
- the connecting mass can be positioned outside of the first passage and can be connected to the valve disc via an axis pin extending through the first passage;
- a block can be attached to an outer surface of the first passage and positioned to stop rotation of the valve disc when the valve disc is rotated to a closed position;
- the supply assembly can include a connection passage fluidically connecting the reservoir outlet to the first and second passages;
- the supply assembly can be substantially Y-shaped with the second passage being longer than the first passage; and/or
- the second passage can be open under positive gravity conditions and negative gravity conditions.

A lubrication system for use with a gas turbine engine can include a reservoir having a reservoir inlet and a reservoir outlet and a supply assembly positioned in the reservoir. The supply assembly can include a first passage, a second passage, and a pivotable valve. The first and second passages can be fluidically connected to the reservoir outlet. The pivotable valve can be fluidically connected to the first passage and configured to be open under positive gravity conditions and to be closed under negative gravity conditions.

The lubrication system of the proceeding paragraph can optionally include, additionally and/or alternatively any, one or more of the following features, configurations and/or additional components:

- the first passage can have a first passage inlet, the second passage can have a second passage inlet, and the second passage inlet can be nearer a top of the reservoir than is the first passage inlet;
- the pivotable valve can include a valve disc that is weighted so as to pivot open under positive gravity conditions and pivot closed under negative gravity conditions; and/or
- the second passage can be free of valves.

A gas turbine engine can include a spool, a fan, a fan drive gear system, a reservoir, and a supply assembly. The spool can include a compressor and a turbine connected by a spool shaft. The fan drive gear system can connect the fan to the spool shaft such that rotation of the spool drives rotation of the fan. The reservoir can have a reservoir inlet and a reservoir outlet. The fan drive gear system can be fluidically connected to the reservoir inlet and the reservoir outlet. The supply assembly can be positioned in the reservoir and include a first passage fluidically connected to the reservoir outlet, a second passage fluidically connected to the reservoir outlet, and a pivotable valve fluidically connected to the first passage. The pivotable valve can be configured to be open under positive gravity conditions and to be closed under negative gravity conditions.

The gas turbine engine of the preceding paragraph can optionally include, additionally and/or alternatively any, one or more of the following features, configurations and/or additional components:

- a supply pump can be fluidically connected between the reservoir outlet and the fan drive gear system and a scavenge pump can be fluidically connected between the fan drive gear system and the reservoir inlet;
- the fan drive gear system can connect the fan to the spool so as to drive rotation of the fan at a slower speed than that of the spool;
- the pivotable valve can include a valve disc that is weighted so as to pivot open under positive gravity conditions and pivot closed under negative gravity conditions; and/or
- the first passage can have a first passage inlet, the second passage can have a second passage inlet, and the second passage inlet can be nearer a top of the reservoir than is the first passage inlet.

The invention claimed is:

1. A fluid system for use with a gas turbine engine, the fluid system comprising:
   a reservoir having a reservoir inlet and a reservoir outlet; and
   a supply assembly positioned in the reservoir, the supply assembly comprising:
      a first passage fluidically connected to the reservoir outlet;
      a second passage fluidically connected to the reservoir outlet, wherein the second passage is free of valves; and
      a valve disc positioned in the first passage, wherein the valve disc is pivotable about an axis and is weighted to have a center of gravity offset from the axis.

2. The fluid system of claim 1, wherein the first passage has a first passage inlet, the second passage has a second passage inlet, and the second passage inlet is nearer a top of the reservoir than the first passage inlet.

3. The fluid system of claim 1, wherein the valve disc is weighted such that the first passage is open under positive gravity conditions and closed under negative gravity conditions.

4. The fluid system of claim 3, wherein the valve disc includes a first material on a first side of the axis, the valve disc includes a second material on a second side of the axis, and the second material has a greater density than that of the first material.

5. The fluid system of claim 3, wherein the valve disc includes a weighted mass attached to a first side of the valve disc.

6. The fluid system of claim 3, wherein the valve disc is weighted via a connecting mass.

7. The fluid system of claim 6, wherein the connecting mass is positioned outside of the first passage and is connected to the valve disc via an axis pin extending through the first passage.

8. The fluid system of claim 7, wherein the supply assembly further comprises:
   a block attached to an outer surface of the first passage and positioned to stop rotation of the valve disc when the valve disc is rotated to a closed position.

9. The fluid system of claim 1, wherein the supply assembly further comprises a connection passage fluidically connecting the reservoir outlet to the first and second passages.

10. The fluid system of claim 9, wherein the supply assembly is substantially Y-shaped with the second passage being longer than the first passage.

11. The fluid system of claim 1, wherein the second passage is open under positive gravity conditions and negative gravity conditions.

12. A lubrication system for use with a gas turbine engine, the lubrication system comprising:
   a reservoir having a reservoir inlet and a reservoir outlet; and
   a supply assembly positioned in the reservoir, the supply assembly comprising:
      a first passage fluidically connected to the reservoir outlet;
      a second passage fluidically connected to the reservoir outlet, wherein the second passage is free of valves; and
      a pivotable valve fluidically connected to the first passage and configured to be open under positive gravity conditions and to be closed under negative gravity conditions.

13. The lubrication system of claim 12, wherein the first passage has a first passage inlet, the second passage has a second passage inlet, and the second passage inlet is nearer a top of the reservoir than is the first passage inlet.

14. The lubrication system of claim 12, wherein the pivotable valve comprises a valve disc that is weighted so as to pivot open under positive gravity conditions and pivot closed under negative gravity conditions.

15. A gas turbine engine comprising:
   a spool comprising a compressor and a turbine connected by a spool shaft;
   a fan;
   a fan drive gear system connecting the fan to the spool shaft such that rotation of the spool drives rotation of the fan;
   a reservoir having a reservoir inlet and a reservoir outlet, wherein the fan drive gear system is fluidically connected to the reservoir inlet and the reservoir outlet; and
   a supply assembly positioned in the reservoir, the supply assembly comprising:
      a first passage fluidically connected to the reservoir outlet;
      a second passage fluidically connected to the reservoir outlet, wherein the second passage is free of valves; and
      a pivotable valve fluidically connected to the first passage and configured to be open under positive gravity conditions and to be closed under negative gravity conditions.

16. The gas turbine engine of claim 15, and further comprising:
   a supply pump fluidically connected between the reservoir outlet and the fan drive gear system; and
   a scavenge pump fluidically connected between the fan drive gear system and the reservoir inlet.

17. The gas turbine engine of claim 15, wherein the fan drive gear system connects the fan to the spool so as to drive rotation of the fan at a slower speed than that of the spool.

18. The gas turbine engine of claim 15, wherein the pivotable valve comprises a valve disc that is weighted so as to pivot open under positive gravity conditions and pivot closed under negative gravity conditions.

19. The lubrication system of claim 15, wherein the first passage has a first passage inlet, the second passage has a second passage inlet, and the second passage inlet is nearer a top of the reservoir than is the first passage inlet.

* * * * *